United States Patent [19]

Russell

[11] Patent Number: 5,535,875
[45] Date of Patent: Jul. 16, 1996

[54] CONVEYOR SYSTEMS

[75] Inventor: Tony A. Russell, Norfolk, United Kingdom

[73] Assignee: Priorlucky Limited, Norfolk, United Kingdom

[21] Appl. No.: 403,837

[22] PCT Filed: Sep. 17, 1993

[86] PCT No.: PCT/GB93/01970

§ 371 Date: Mar. 16, 1995

§ 102(e) Date: Mar. 16, 1995

[87] PCT Pub. No.: WO94/06709

PCT Pub. Date: Mar. 31, 1994

[30] Foreign Application Priority Data

Sep. 18, 1992 [GB] United Kingdom ............. 9219732

[51] Int. Cl.⁶ .................................. B65G 47/86
[52] U.S. Cl. ................ 198/803.01; 198/803.8; 198/838
[58] Field of Search ............... 198/465.1, 465.2, 198/470.1, 473.1, 485.1, 683, 684, 687.1, 803.01, 803.07, 803.8, 838, 841

[56] References Cited

U.S. PATENT DOCUMENTS

| | | | |
|---|---|---|---|
| 3,120,892 | 2/1964 | Henning et al. | 198/803.8 |
| 3,342,304 | 9/1967 | Greulich | 198/803.8 X |
| 3,713,648 | 1/1973 | Spika | 198/803.7 X |
| 4,388,990 | 6/1983 | Michalik | 198/803.01 |
| 4,501,351 | 2/1985 | Tracy | 198/803.01 |
| 4,723,906 | 2/1988 | Gibbemeyer | 198/803.7 X |
| 4,779,717 | 10/1988 | Eberle | 198/803.8 |
| 4,930,620 | 6/1990 | Springman | 198/803.01 |
| 4,953,691 | 9/1990 | Janzen | 198/803.01 |
| 4,993,996 | 2/1991 | Horny et al. | 198/463.2 X |
| 5,337,887 | 8/1994 | Greenwell et al. | 198/803.01 |
| 5,346,050 | 9/1994 | Mojden et al. | 198/841 X |

*Primary Examiner*—D. Glenn Dayoan
*Attorney, Agent, or Firm*—McGlew and Tuttle

[57] ABSTRACT

A conveyor system for delicate items such as mushrooms has a roller-type conveyor chain (10) arranged to run with its pin axes generally vertical. At spaced intervals along the chain are mounted support arms (13) projecting laterally from the chain. The chain-end of each arm has a re-entrant which resiliently embraces two rollers (18) of the chain, and allows the arm to release from the chain in the event of an obstruction. At the other end, each arm is bifurcated to define two limbs (36,37). One limb has a surface which is resiliently movable away from the confronting surface of the other limb.

20 Claims, 3 Drawing Sheets

CONVEYOR SYSTEMS

BACKGROUND OF THE INVENTION

This invention generally concerns conveyor systems. In particular, the invention relates to a conveyor chain suitable for carrying articles along a path along which the conveyor chain is constrained to run, and also relates to an arm for use in a conveyor system, to support an article to be conveyed. The invention further relates to a conveyor system incorporating a conveyor chain of this invention, or incorporating an arm of this invention, as well as to a conveyor system incorporating both a chain and an arm of this invention.

There have been innumerable designs of conveyor systems employing a chain adapted to support and convey the articles to be carried by the conveyor system, from one point to another. The chains used in such a system are either specially designed and constructed for the intended purpose, or comprise conventional chains which have been modified—for example by welding or otherwise affixing components to the chain so as to render the chain suitable for carrying the articles. Not infrequently, a chain conveyor may jam, perhaps on account of an article being improperly carried or falling off the conveyor, so leading to a blockage, and this very often results in damage to the conveyor chain. The repair of the chain will then result in the conveyor system being non-operational for a while, and may require the replacement of a length of the chain.

SUMMARY OF THE INVENTION

It is a principal aim of the present invention to provide a conveyor system which is less prone to damage in the event of a blockage or jam, caused by an obstruction in the path of the supports for articles to be carried, by appropriately configuring the conveyor chain and the interconnection with each support.

According to this invention, there is provided a conveyor chain comprising a series of links each having a pair of parallel spaced side plates with the plates of one link pivoted to the plates of the next adjacent link by a respective pin extending transversely to the length of the chain, and a plurality of supports for articles to be conveyed spaced along the length of the chain, each support being releasably coupled to the chain and projecting laterally thereof, each support comprising an arm adapted to support an article to be conveyed and having at one end portion chain engagement means in the form of a re-entrant opening the maximum internal width of which is such that two adjacent pins of the chain may be accommodated therein, at least the part of the arm defining the opening being resiliently deformable to permit the arm to be sprung on to and off a pair of adjacent pins.

It will be appreciated that a chain constructed and arranged as described has a plurality of supports for articles to be conveyed, which supports are connected to the chain in such a way that the supports are able automatically to release themselves from the chain in the event of there being an obstruction in the path of advancement of those supports. Such an obstruction could comprise articles which should have been conveyed and yet which have fallen from the supports, a mall-function of a mechanism for loading articles on to the supports or removing them from the supports, or even a human operator—in which latter case injury to the operator will also be minimised.

At least the end portion of each support, but preferably the entire support, may be moulded from a plastics material which exhibits sufficient resiliency to permit the arm to be resiliently snapped on to and off a pair of chain pins. Preferably, the end portion of the support is a close fit between the side plates of the chain, whereby the support is securely supported by the chain when fitted thereto.

A preferred construction of chain of this invention has an external third side plate disposed parallel to and spaced from the pair of side plates of a link which is to carry an article support, the pins associated with that link being extended and carrying the third side plate externally of said pair, and the article support being mounted on the portions of the two pins disposed between the third side plate and the adjacent side plate of the pair thereof of that link. This allows the chain to be used with guide means therefor, which guide means engage the main part of the chain from both sides, since the support will project laterally of the chain, above such guide means. For example, the guide means could comprise a pair of elongate members in a parallel co-planar spaced-apart manner so as to define an elongate slot therebetween, along which slot the chain is constrained to run.

The chain itself may be a roller chain of a conventional construction. Conveniently, the chain is a conventional simplex roller chain, which has conventional duplex roller links spaced apart along the length thereof, at each location where a support is to be connected to the chain. For heavy-duty operation, a conventional duplex chain could be employed, but with triplex links at each location where a support is to be carried.

The end portion of each support remote from the chain may appropriately be configured for the articles to be conveyed, having regard to the physical characteristics of those articles. A particular problem arises when delicate items, especially of produce such as mushrooms, are to be conveyed. Such produce must be handled very gently in order to avoid bruising or otherwise damaging the items, but each item must be held sufficiently well to ensure its reliable carriage on the conveyor system until it is to be discharged.

When delicate items such as mushrooms are to be conveyed, each arm may be bifurcated at its other end to define two limbs upon which an article may be supported with a part of the article projecting downwardly between the two limbs, the two limbs having respective limb surfaces which generally confront one another and the limb surface of at least one limb being resiliently deformable away from the other limb surface, whereby a part of an article of a sufficient size on being moved into the gap between the two limb surfaces may resiliently deform said at least one limb surface so as thereby to urge the part of the article against the other limb surface.

It will be appreciated that in the conveying of delicate produce such as mushrooms, the stalk of a mushroom will be located between the limbs and will resiliently deform as much as is necessary said surface of one limb, as the stalk of the mushroom moved into the gap between the two limbs. The deformation of that surface, acting in co-operation with the confronting surface of the other limb, will lightly grip the stalk of the mushroom, without causing damage to the cap, while allowing the accommodation of a wide size range.

In one embodiment, the limb surface of said at least one limb is defined by a strip of a resilient material lining the respective limb of the arm. As an alternative, the limb surface of said at least one limb is defined by a strip of a resilient material which is stretched between two spaced apart points on the arm. In either case, the gap between the two limbs preferably is of decreasing width in the direction of towards said one end of the arm.

Another possibility is to have said at least one limb provided with a finger flexibly coupled to said limb adjacent the free end thereof and which faces the other limb so as to define a gap between the two limbs of gradually decreasing width towards said one end portion of the arm, the finger being resiliently movable away from said other limb upon a part of an article being moved into said gap. Such a flexible coupling may comprise a hinge connecting the finger to said one limb of the arm, or a region of thinned material which deforms as the finger is moved away from its normal position. In the latter case, said region may deform resiliently to provide a restoring force to the finger as the finger is moved away from its normal position.

Conveniently, the arm is moulded from a plastics material which both forms the hinge of the finger and provides a restoring force to return the finger to its normal position. Of course, the resilient surface or finger may be associated with each limb of the arm, and preferably the arrangement for the limbs of one arm is essentially the same, but could take alternative forms.

This invention further extends to a conveyor system whenever utilising a conveyor chain of this invention as discussed above, whether or not having a support arm also as discussed above.

BRIEF DESCRIPTION OF THE INVENTION

By way of example only, one specific embodiment of a conveyor system incorporating both a conveyor chain and a support arm both arranged in accordance with the present invention will now be described in detail, reference being made to the accompanying drawings, in which.

DETAILED DESCRIPTION OF THE PREFERRED EMBODIMENT

Figure 1:
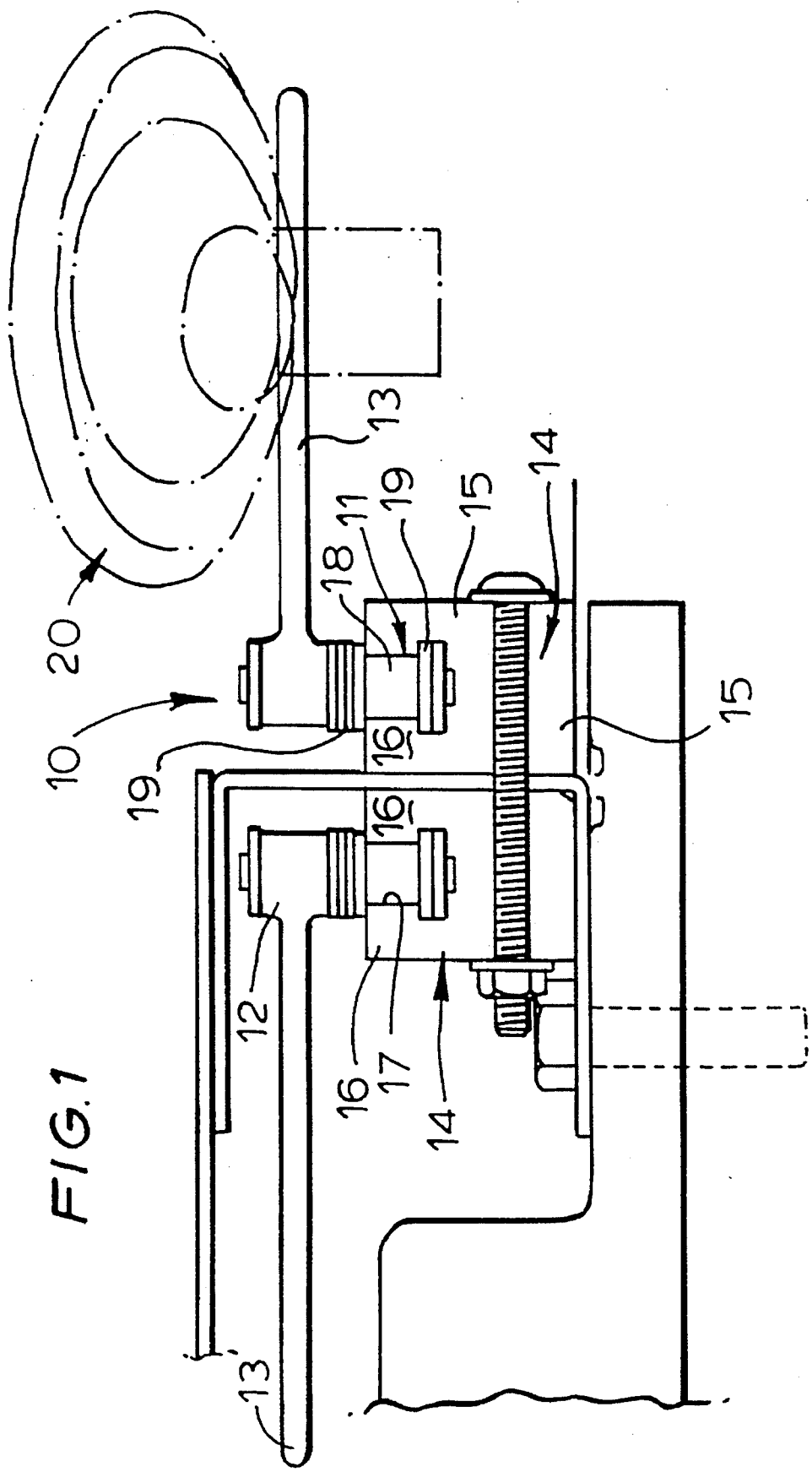
FIG. 1 is a diagrammatic vertical sectional view through a part of the embodiment of conveyor system of this invention.

The conveyor system shown in the drawings includes a roller conveyor chain 10 made up from a series of simplex links 11 but having duplex links 12 regularly spaced along the length of the chain. The part of each duplex link out of alignment with the simplex links 11 carries a support arm 13, shown in detail in FIGS. 3 and 4. The chain 10 is an endless loop constrained to run around a path defined at least in part by guides 14. Each such guide comprises a pair of elongate members 15 the upper parts 16 of which define between them a slot 17 the width of which is such that the rollers 18 of the chain 10 may run freely therealong. Moreover, the height of the upper parts 16 defining the slot 17 is substantially equal to the spacing between the side plates 19 of the chain, whereby the chain 10 is a smooth running fit within the slot 16 and yet is supported thereby.

As shown in FIG. 1, the duplex links 12 of the chain are disposed above the guides 14, whereby the support arms 13 carried by the chain project laterally above the guides. Conveyed articles such as mushrooms diagrammatically indicated at 20 are thus carried clear of the guides, and the likelihood of impact therewith is greatly reduced.

Figure 2:
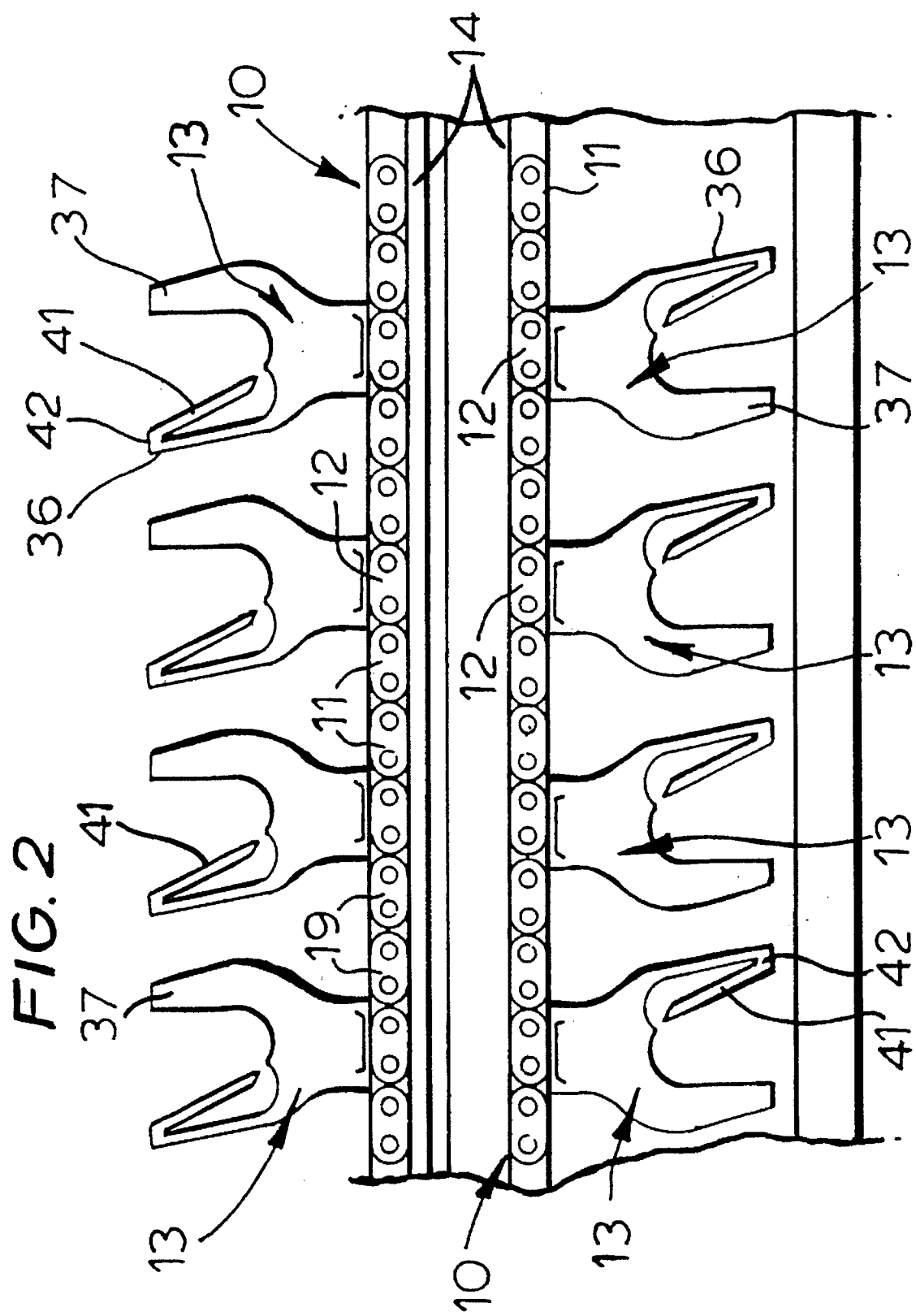
FIG. 2 is a diagrammatic plan view on two parallel runs of the conveyor chain used in the conveyor system.
Figure 4:
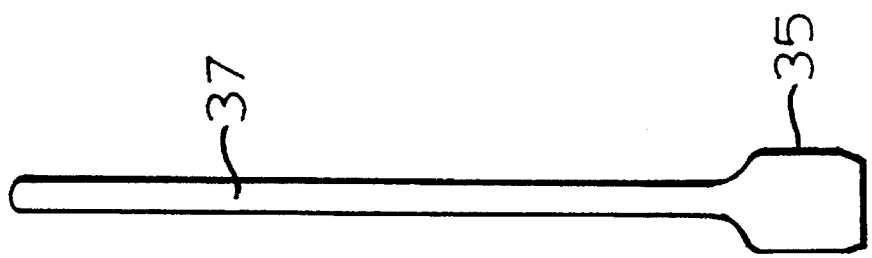
FIGS. 3 and 4 are respectively plan and side views of a support arm used in the conveyor system of FIGS. 1 and 2.
Figure 3:
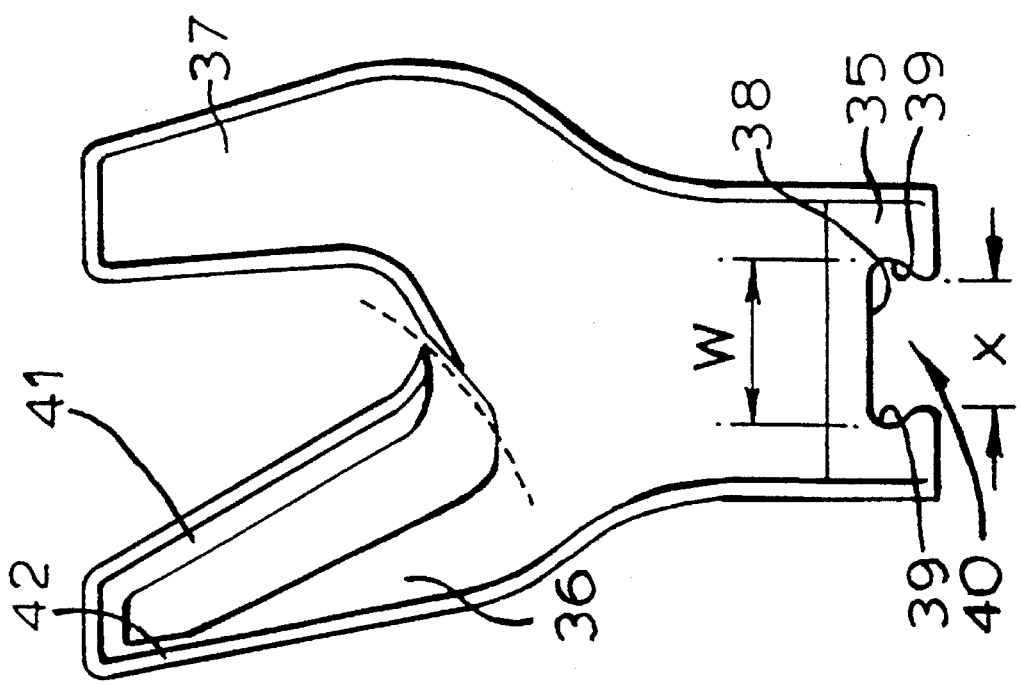

FIGS. 3 and 4 show in greater-detail a support arm 13 as used in the conveyor system of FIGS. 1 and 2. This support arm is moulded from a plastics material and has a thickened mounting portion 35 at one end, the other end portion of the arm being bifurcated to provide two limbs 36 and 37.

The thickened end portion 35 defines a re-entrant slot 38 the maximum internal width W of which is substantially equal to the maximum overall distance between adjacent pairs of rollers 18 of the chain 10—that is, equal to the pitch of the chain plus one roller diameter. The ends 39 of the slot 38 are arcuate, with the same radius of curvature as each roller 18, and the width x of the opening 40 to the slot 38 is substantially equal to the pitch of the chain 10. The thickness of the end portion 35 is substantially equal to the distance between the side plates of each duplex link, as may be appreciated from FIG. 1.

Limb 36 of the arm 13 is divided so as to form a finger 41 facing limb 37, that finger 41 being connected to the remainder of limb 36 by means of a hinge 42 defined by a region of thinned material. This hinge 42 is resiliently deformable by flexing of the plastics material, whereby the finger 41 may be moved from its "normal" position illustrated in FIG. 3.

In its normal position, the finger 41 defines in conjunction with limb 37 a gap of gradually reducing width, from the free end of the arm, whereby an article (such as the stalk of a mushroom) pressed into that gap will move the finger against its resilient bias provided by the hinge 42, as much as is necessary for the stalk of the mushroom to be accommodated at or adjacent the end of the gap nearest the end portion 35. When so located, the cap of the mushroom will be supported by the limbs 36 and 37, and the stalk itself may also be gripped lightly between the finger 41 and the opposed limb 37.

The arm 13 is mounted on a duplex link 12 of the chain 10 by springing the end portion of the arm onto a duplex link, such that the rollers of that link are located within the slot 38. When so located, the arm is securely held in position on the chain, by virtue of the end portion fitting between the side plates of the duplex link and the rollers being gripped within the slot 38. However, the arm may spring off the chain should its movement be obstructed with a sufficient force to cause the springing of the end portion of the arm to an extent sufficient for a roller to come out of the slot 38.

Figure 5:
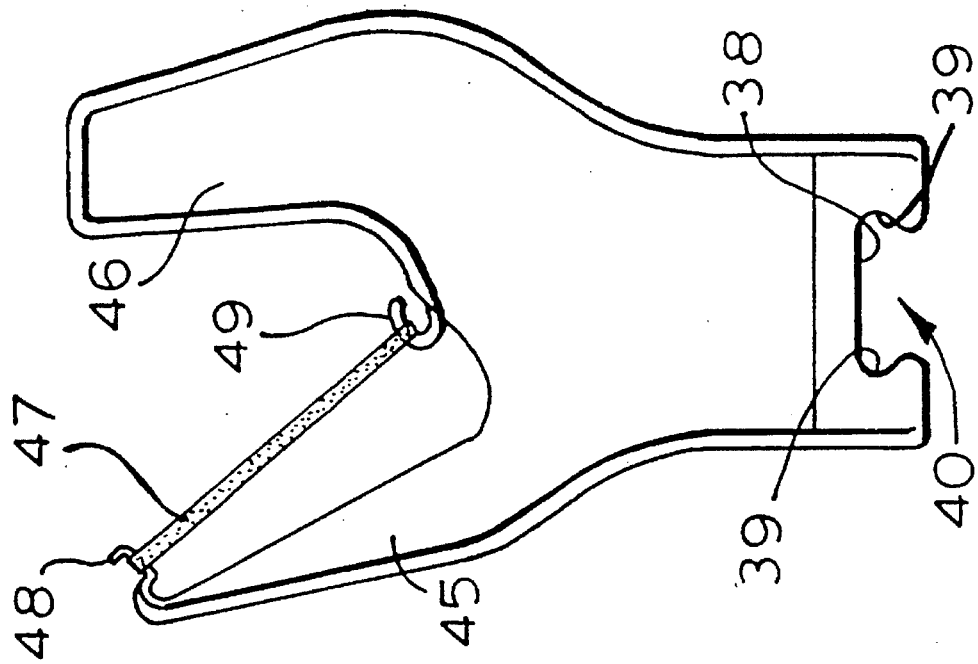
FIG. 5 is a plan view of an alternative form of support arm.

FIG. 5 shows an alternative support arm, for use instead of that shown in FIGS. 4 and 5. The one end of the support arm is of the same form as that of FIGS. 4 and 5 and will not be described again here. The other end of the arm is bifurcated to provide two limbs 45 and 46, limb 46 being similar to limb 37 of FIG. 4. Limb 45 differs in that no finger 41 is provided; instead a resilient strip 47 is stretched between hooks 48 and 49 so that the strip 47 provides an article-engagement surface facing limb 46.

When an article is pressed into the gap between the two limbs 45 and 46, the strip 47 will deform as necessary to accommodate the article, such as a mushroom stalk. This deformation allows the stalk to be held lightly, without damaging the mushroom.

I claim:

1. A conveyor chain comprising a series of links each having a pair of parallel spaced side plates with the plates of one link pivoted to the plates of the next adjacent link by a respective pin extending transversely to the length of the chain, and a plurality of supports for articles to be conveyed spaced along the length of the chain, each support being releasably coupled to the chain and projecting laterally thereof, each support comprising an arm adapted to support an article to be conveyed and having at one end portion chain engagement means in the form of a re-entrant opening the maximum internal width of which is such that two adjacent pins of the chain may be accommodated therein, at lease the part of the arm defining the opening being resiliently deformable to permit the arm to be sprung on to and off a pair of adjacent pins.

2. A conveyor chain as claimed in claim 1, wherein at least the end portion of the arm defining the chain engagement means is moulded from a plastics material which exhibits sufficient resiliency to permit the arm to be sprung on and off a pair of chain pins.

3. A conveyor chain as claimed in claim 2, wherein the entire arm is moulded from a plastics material.

4. A conveyor chain as claimed in claim 1, wherein the end portion of the arm is a close fit between the side plates of the chain whereby the arm is supported thereby.

5. A conveyor chain as claimed in claim 1, wherein the opening is generally C-shaped.

6. A conveyor chain as claimed in claim 1, wherein each link which is to carry an article support has an external third side plate disposed parallel to and spaced from said pair of side plates of that link, the pins associated with that link being extended and carrying the third side plate, and the article support means being mounted on the portions of the two pins disposed between the third side plate and the adjacent side plate of the pair thereof of that link.

7. A conveyor chain as claimed in claim 1, wherein each pin of the chain carries a rotatable roller disposed between the side plates, and the chain engagement means of each arm has an internal width sufficient to accommodate two adjacent pins together with the rollers of those pins.

8. A conveyor chain as claimed in claim 1, wherein the other end portion of the arm remote from the chain engagement means is bifurcated so as to define two limbs upon which an article may be supported with a part of the article projecting downwardly between the two limbs.

9. A conveyor chain as claimed in claim 1, wherein at least one of said arms is bifurcated at its other end to define two limbs upon which an article may be supported with a part of the article projecting downwardly between the two limbs, the two limbs having respective limb surfaces which generally confront one another and the limb surface of at least one limb being resiliently deformable away from the other limb surface, whereby said part of an article of a sufficient size on being moved into the gap between the two limb surfaces may resiliently deform said at least one limb surface so as thereby to urge the part of the article against the other limb surface.

10. A conveyor chain as claimed in claim 9, wherein the limb surface of said at least one limb is defined by a strip of a resilient material lining the respective limb of the arm.

11. A conveyor chain as claimed in claim 9, wherein the limb surface of said at least one limb is defined by a strip of a resilient material which is stretched between two spaced apart points on the arm.

12. A conveyor chain as claimed in claim 9, wherein the gap between the two limbs is of decreasing width in the direction of towards said one end of the arm.

13. A conveyor chain as claimed in claim 9, wherein said at least one limb has a finger flexibly coupled to said limb adjacent the free end thereof and which faces the other limb so as to define a gap between the two limbs of gradually decreasing width towards said one end portion of the arm, the finger being resiliently movable away from said other limb upon a part of an article being moved into said gap.

14. A conveyor chain as claimed in claim 13, wherein the flexible coupling comprises a hinge connecting the finger to said one limb of the arm.

15. A conveyor chain as claimed in claim 13, wherein the flexible coupling comprises a region of thinned material which deforms as the finger is moved away from its normal position.

16. A conveyor chain as claimed in claim 15, wherein the region of thinned material deforms resiliently to provide a restoring force to the finger as the finger is moved away from its normal position.

17. A conveyor chain as claimed in claim 15, wherein the arm is moulded from a plastics material which material forms the flexible coupling for the finger and provides a restoring force to return the finger to its normal position.

18. A conveyor system comprising an endless loop of a conveyor chain as claimed in claim 1, in combination with means to guide the chain around a path with the pins of the chain disposed substantially vertically and the side plates of the chain disposed substantially horizontally, the arms being coupled to the links so as to project laterally outwardly of the loop of chain.

19. A conveyor system comprising an endless loop of a conveyor chain as claimed in claim 6, in combination with means to guide the chain around a path with the pins of the chain disposed substantially vertically and the side plates of the chain disposed substantially horizontally, the guide means cooperating with both sides of the chain for at least part of the length thereof, between the pairs of side plates of the chain and the arms projecting from between the third side plate of the chain and the adjacent side plate thereof, to extend over the guide means for the chain.

20. A conveyor system according to claim 19, wherein the guide means comprises a pair of elongate members disposed in a parallel co-planar spaced-part manner so as to define an elongate slot therebetween, along which slot the chain is constrained to run.

* * * * *

UNITED STATES PATENT AND TRADEMARK OFFICE
CERTIFICATE OF CORRECTION

PATENT NO. : 5,535,875
DATED : July 16, 1996
INVENTOR(S) : Tony Albert RUSSELL

It is certified that error appears in the above-indentified patent and that said Letters Patent is hereby corrected as shown below:

Title page, item [75], correct the inventor's name to read

Tony Albert Russell.

Signed and Sealed this

Fifth Day of November, 1996

Attest:

BRUCE LEHMAN

Attesting Officer        Commissioner of Patents and Trademarks